(12) United States Patent
Volmerding et al.

(10) Patent No.: US 11,708,779 B2
(45) Date of Patent: Jul. 25, 2023

(54) SYSTEMS AND METHODS FOR DRY CHEMICAL REDUCTANT INSERTION IN AFTERTREATMENT SYSTEMS

(71) Applicant: Cummins Emission Solutions Inc., Columbus, IN (US)

(72) Inventors: Matthew K. Volmerding, Columbus, IN (US); Christopher T. Brown, Aliso Viejo, CA (US); Ulises Mondragon, San Bernardino, CA (US); Vincent McDonell, Irvine, CA (US)

(73) Assignee: Cummins Emission Solutions Inc., Columbus, IN (US)

( * ) Notice: Subject to any disclaimer, the term of this patent is extended or adjusted under 35 U.S.C. 154(b) by 176 days.

(21) Appl. No.: 17/281,317

(22) PCT Filed: Aug. 29, 2019

(86) PCT No.: PCT/US2019/048905
§ 371 (c)(1),
(2) Date: Mar. 30, 2021

(87) PCT Pub. No.: WO2020/072152
PCT Pub. Date: Apr. 9, 2020

(65) Prior Publication Data
US 2021/0404365 A1 Dec. 30, 2021

Related U.S. Application Data

(60) Provisional application No. 62/740,215, filed on Oct. 2, 2018.

(51) Int. Cl.
*F01N 3/20* (2006.01)
*B01D 53/90* (2006.01)
(Continued)

(52) U.S. Cl.
CPC .......... *F01N 3/2066* (2013.01); *B01D 53/90* (2013.01); *B01D 53/9431* (2013.01);
(Continued)

(58) Field of Classification Search
CPC combination set(s) only.
See application file for complete search history.

(56) References Cited

U.S. PATENT DOCUMENTS 5,809,775 A * 9/1998 Tarabulski .............. F01N 3/208
60/274
6,114,176 A 9/2000 Edgson et al.
(Continued)

FOREIGN PATENT DOCUMENTS

| CA | 3001076 A1 | 4/2017 |
| CN | 105201603 A | 12/2015 |

(Continued)

OTHER PUBLICATIONS

First Office Action issued in Chinese Patent Application No. CN 201980064868.9 dated Mar. 22, 2022, 9 pages.
(Continued)

*Primary Examiner* — Binh Q Tran
(74) *Attorney, Agent, or Firm* — Foley & Lardner LLP

(57) ABSTRACT

A reductant insertion system for an after treatment system configured to decompose constituents of an exhaust gas, includes: a dry reductant tank configured to contain a dry reductant; a reductant delivery line configured to operatively couple the dry reductant tank to the after treatment system for delivery of the dry reductant to the after treatment system; and a pressurized gas source configured to communicate the dry reductant to the after treatment system through the reductant delivery line using pressurized gas.

9 Claims, 11 Drawing Sheets

(51) Int. Cl.
*B01D 53/94* (2006.01)
*B01J 19/00* (2006.01)
*B01J 19/20* (2006.01)
*F01N 3/029* (2006.01)

(52) U.S. Cl.
CPC ........... *B01J 19/0033* (2013.01); *B01J 19/20* (2013.01); *B01D 2251/2067* (2013.01); *B01J 2219/00058* (2013.01); *B01J 2219/00162* (2013.01); *F01N 3/0293* (2013.01); *F01N 3/206* (2013.01); *F01N 2250/12* (2013.01); *F01N 2570/14* (2013.01); *F01N 2610/02* (2013.01); *F01N 2610/10* (2013.01); *F01N 2610/12* (2013.01); *F01N 2610/14* (2013.01); *F01N 2610/1406* (2013.01); *F01N 2610/1453* (2013.01); *F01N 2900/04* (2013.01); *F01N 2900/1406* (2013.01); *F01N 2900/18* (2013.01); *F01N 2900/1824* (2013.01)

(56) References Cited

U.S. PATENT DOCUMENTS

| | | |
|---|---|---|
| 7,497,075 B2 | 3/2009 | Ripper et al. |
| 2002/0124568 A1* | 9/2002 | Mikkelsen ......... B01D 53/9404 60/685 |
| 2004/0040288 A1* | 3/2004 | Jacob ................ B01D 53/8631 60/301 |
| 2005/0284135 A1* | 12/2005 | Bertiller ................ B01D 53/90 60/286 |
| 2008/0250779 A1 | 10/2008 | Bruck et al. |
| 2008/0260597 A1* | 10/2008 | Suzuki .................... C01C 1/026 422/148 |
| 2013/0028817 A1 | 1/2013 | Ayyappan et al. |
| 2013/0239549 A1 | 9/2013 | Henry et al. |
| 2013/0259755 A1* | 10/2013 | Kim ....................... B01D 53/92 422/111 |
| 2014/0286829 A1* | 9/2014 | Qi ........................... F01N 3/208 422/112 |
| 2019/0234283 A1* | 8/2019 | Adelman ........... B01D 53/9418 |

FOREIGN PATENT DOCUMENTS

| | | |
|---|---|---|
| EP | 0 615 777 A1 | 9/1994 |
| EP | 1 048 360 A1 | 11/2000 |
| JP | 05-272331 A | 10/1993 |
| KR | 20160102663 A | 8/2016 |

OTHER PUBLICATIONS

Examination Report issued for UK Patent Application No. GB 2104245.2 dated Mar. 11, 2022, 3 pages.
International Search Report and Written Opinion issued for PCT Application No. PCT/US2019/048905 dated Nov. 18, 2019, 11 pages.

\* cited by examiner

SYSTEMS AND METHODS FOR DRY CHEMICAL REDUCTANT INSERTION IN AFTERTREATMENT SYSTEMS

CROSS REFERENCE TO RELATED APPLICATIONS

The present application is a national stage of PCT Application No. PCT/US2019/048905, filed Aug. 29, 2019, which claims the benefit of U.S. Provisional Application No. 62/740,215, filed Oct. 2, 2018. The contents of these applications are incorporated herein by reference in their entireties.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally exhaust gas aftertreatment systems include any of several different components to reduce the levels of harmful exhaust emissions present in the exhaust gas. For example, certain exhaust gas aftertreatment systems for diesel-powered IC engines include a selective catalytic reduction (SCR) system including a catalyst formulated to convert NOx (NO and $NO_2$ in some fraction) into harmless nitrogen gas ($N_2$) and water vapor ($H_2O$) in the presence of ammonia ($NH_3$). Generally in such aftertreatment systems, an exhaust reductant (e.g., a diesel exhaust fluid such as a urea solution) is injected into the SCR system to provide a source of ammonia, and mixed with the exhaust gas to partially reduce the NOx gases. The reduction byproducts of the exhaust gas are then communicated to the catalyst included in the SCR system to decompose substantially all of the NOx gases into relatively harmless byproducts which are expelled out of the aftertreatment system.

SUMMARY

Exhaust reductants used in conventional aftertreatment systems generally include a liquid reductant that is inserted into the SCR system or upstream thereof. Liquid reductants however, pose various challenges. For example, when liquid reductants are inserted into an aftertreatment system, a stream of the liquid reductant may impinge on internal surfaces of the aftertreatment system and form byproducts, which form reductant deposits on internal surface of the aftertreatment system. Furthermore, very low temperatures (e.g., less than −11 degrees Celsius) can cause the reductant to freeze in reductant insertion assemblies. This increases cost of the aftertreatment system due to inclusion of heating systems for (e.g., heating lines or electrical heaters), increases energy and fuel consumption, as well as leads to increased maintenance costs. Heaters often have to be included in such reductant insertion assemblies to thaw the reductant in cold ambient conditions, which increases the complexity of the system. Furthermore, liquid reductant inserted into the aftertreatment system can impinge on sidewalls of the aftertreatment system, resulting in formation of reductant deposits on the sidewalls and/or components of the aftertreatment system. Reductant deposits reduce the efficiency of the aftertreatment system and may cause clogging and eventual failure of the SCR system and/or downstream components. Reductant deposits cause frequent maintenance to be performed on the aftertreatment system, increasing maintenance costs. Alternate reductant deposit removal strategies include heating the exhaust gas to temperatures above 450 degrees Celsius, for example, by inserting hydrocarbons in the exhaust gas. However, this increases fuel consumption.

Embodiments described herein relate generally to systems and methods for delivering a dry reductant to an aftertreatment system, and in particular to reductant insertion systems that allow for gravity assisted delivery of the dry reductant, or include a pressurized gas source for providing gas assisted delivery of the dry reductant into an exhaust gas flowing through the aftertreatment system.

In one embodiment, a reductant insertion system for an aftertreatment system configured to decompose constituents of an exhaust gas comprises: a dry reductant tank configured to contain a dry reductant; a reductant delivery line configured to operatively couple the dry reductant tank to the aftertreatment system for delivery of the dry reductant to the aftertreatment system; and a pressurized gas source configured to communicate the dry reductant to the aftertreatment system through the reductant delivery line using pressurized gas.

In some embodiments, the pressurized gas source comprises compressed gas occupying a volume of the dry reductant tank and exerting pressure on the dry reductant.

In some embodiments, a pressure release valve is operatively coupled to the dry reductant tank, the pressure release valve configured to open in response to a pressure within the dry reductant tank exceeding a predetermined pressure threshold.

In some embodiments, a valve is disposed in the reductant delivery line, the valve configured to be selectively opened for communicating a predetermined volume of the dry reductant to the aftertreatment system. In some embodiments, the reductant insertion system further comprises a pressure sensor integrated with the valve.

In some embodiments, a shutoff valve is coupled to an outlet of the dry reductant tank and configured to selectively close to prevent dry reductant from being communicated out of the dry reductant tank.

In some embodiments, the pressurized gas source comprises a compressed gas source coupled to the reductant delivery line and configured to provide compressed gas therethrough to the aftertreatment system, In such embodiments, the reductant insertion system further comprises: a reductant communication line operatively coupling the dry reductant tank to the reductant delivery line; and a dry reductant feeder coupled to the reductant communication line and configured to communicate the dry reductant from the dry reductant tank to the reductant delivery line via the reductant communication line.

In some embodiments, an educator is coupled to the reductant delivery line downstream of the reductant communication line. In such embodiment, the pressurized gas source is coupled to the reductant delivery line via the eductor, and the eductor configured to generate suction in the reductant delivery line for delivering the dry reductant to the aftertreatment system via the reductant delivery line.

In some embodiments, a first end of the reductant delivery line upstream of the reductant communication line is open to atmosphere.

In some embodiments, the pressurized gas source comprises an exhaust gas recirculation line coupled to a first end of the reductant delivery line, the pressurized gas being recirculated exhaust gas. In such embodiments, the reductant insertion system further comprises: a reductant communication line coupling the dry reductant tank to the reductant delivery line; and a dry reductant feeder coupled to the reductant communication line and configured to communicate the dry reductant from the dry reductant tank to the reductant delivery line via the reductant communication line.

In some embodiments, the reductant insertion system also comprises a heater configured to heat the recirculated exhaust gas to a temperature sufficient to substantially decompose the dry reductant.

In some embodiments, a valve is coupled to the exhaust gas recirculation line and configured to be selectively opened for communicating the recirculated exhaust gas to the reductant delivery line.

In another embodiment, a reductant insertion system for an aftertreatment system configured to decompose constituents of an exhaust gas comprises a dry reductant tank configured to contain a dry reductant; a reductant delivery line configured to operatively couple the dry reductant tank to the aftertreatment system to allow gravity assisted delivery of the dry reductant to the aftertreatment system from the dry reductant tank.

In some embodiments, a reductant communication line operatively coupling the dry reductant tank to the reductant delivery line; and a dry reductant feeder coupled to the reductant communication line and configured to communicate the dry reductant from the dry reductant tank to the reductant delivery line via the reductant communication line. In some embodiments, the dry reductant feeder comprises a screw feeder.

In some embodiments, a method for inserting dry reductant into an exhaust gas flowing through an aftertreatment system comprises: determining an operating condition of the exhaust gas; providing a pressurized gas to a reductant delivery line of a reductant insertion system, the reductant insertion system comprising: a dry reductant tank containing a dry reductant, a reductant delivery line operatively coupling the dry reductant tank to the aftertreatment system, and a pressurized gas source for providing the pressurized gas; and activating a dry reductant feeder of the reductant insertion system to deliver the dry reductant to the aftertreatment system via the reductant delivery line.

In some embodiments, the method also comprises: prior to providing the pressurized gas to the reductant delivery line, determining a temperature of the pressurized gas; and in response to the temperature being less than a temperature threshold, heating the pressurized gas to a temperature sufficient to decompose the dry reductant. In some embodiments, the pressurized gas source comprises a compressed gas source. In some embodiments, the pressurized gas source comprises a recirculated exhaust gas source. In some embodiments, the dry reductant feeder comprises a screw feeder.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. The disclosure will be described with additional specificity and detail through use of the accompanying drawings, but it should be understood that these drawings depict only several implementations in accordance with the disclosure and are therefore not to be considered limiting of its scope.

Figure 1A:
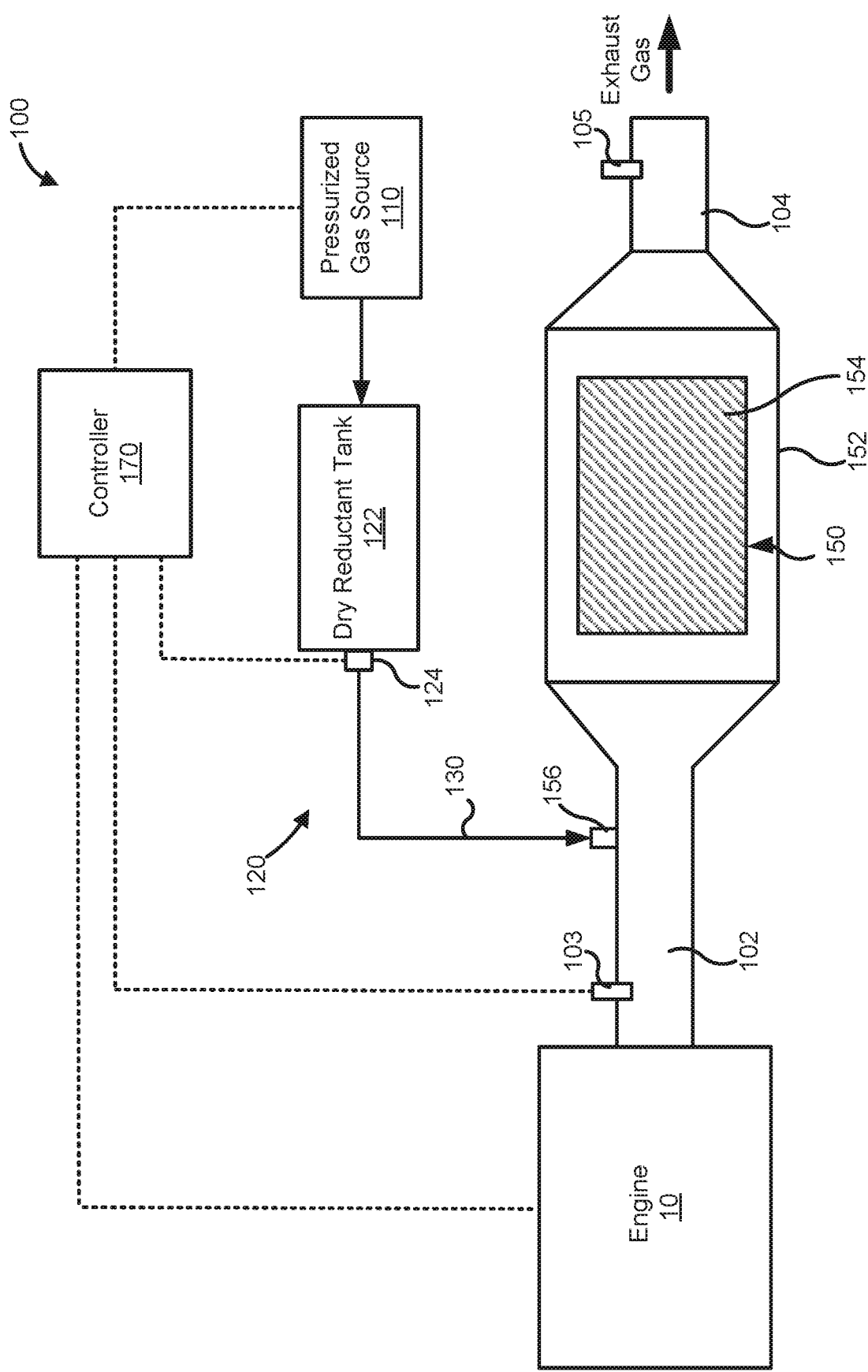
FIG. 1A is a schematic block diagram of an aftertreatment system, according to an embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate generally to systems and methods for delivering a dry reductant to an aftertreatment system, and in particular to reductant insertion systems that allow for gravity assisted delivery of the dry reductant, or include a pressurized gas source for providing gas assisted delivery of the dry reductant into an exhaust gas flowing through the aftertreatment system.

Liquid reductants are generally used to facilitate decomposition of exhaust gases flowing through SCR systems. Liquid reductants however, can impinge on internal surfaces of the aftertreatment system and form byproducts, which form reductant deposits on internal surface of the aftertreatment system, while very low temperatures (e.g., less than −11 degrees Celsius) can cause the reductant to freeze in reductant insertion assemblies. This leads to increased maintenance costs. Heaters often have to be included in such reductant insertion assemblies to thaw the reductant in cold ambient conditions which increases the complexity and cost of the system. Reductant deposits reduce the efficiency of the aftertreatment system and may cause clogging and eventual failure of the SCR system and/or downstream components. Reductant deposits cause frequent maintenance to be performed on the aftertreatment system, increasing maintenance costs.

Various embodiments of the reductant insertion systems described herein may provide one or more benefits including, for example: (1) inserting a dry reductant into the aftertreatment system instead of a liquid reductant which prevents problems associated with decomposition or freezing of liquid reductants within reductant insertion systems; (2) eliminating use of heating lines for thawing reductant, or pumps and/or filters generally used in liquid reductant insertion systems, thereby reducing system complexity and cost; (3) reducing decomposition energy by removing water from the reductant; (4) significantly reducing deposit risk and providing faster decomposition times relative to liquid reductants leading to faster ammonia release, improved turbulent diffusion and higher uniformity index (UI); (5) allowing reduction of storage space and weight by about 50% or more relative to storage space used for liquid reductants; (6) providing significantly higher safety relative to gaseous ammonia insertion systems, by providing a dry reductant which is stable in powder form relative to a gaseous reductant which can leak; and (7) providing flexibility of using various dry reductants, such as powdered urea, ammonia carbonate, ammonium carbamate or any other suitable dry reductant.

FIG. 1A is a schematic illustration of an aftertreatment system 100, according to an embodiment. The aftertreatment system 100 is coupled to an engine 10 (e.g., diesel engine, a gasoline engine, a natural gas engine, a biodiesel engine, a dual fuel engine, an alcohol engine, an E85, a reciprocating engine, a rotary engine, a gas turbine, or any other suitable internal combustion engine) and configured to receive an exhaust gas (e.g., a diesel exhaust gas) from the engine 10 to reduce constituents of the exhaust gas such as, for example, NOx gases, CO, etc. The aftertreatment system 100 includes a reductant insertion system 120 comprising a dry reductant tank 122 and a pressurized gas source 110, a SCR system 150 and a controller 170.

The SCR system 150 comprises a housing 152 defining an internal volume within which at least one catalyst 154 formulated to decompose constituents of an exhaust gas flowing therethrough is positioned. The housing 152 may be formed from a rigid, heat-resistant and corrosion-resistant material, for example stainless steel, iron, aluminum, metals, ceramics, or any other suitable material. The housing 152 may have any suitable cross-section, for example circular, square, rectangular, oval, elliptical, polygonal, or any other suitable shape.

In some embodiments, the SCR system 150 may comprise a selective catalytic reduction filter (SCRF) system, or any other aftertreatment component configured to decompose constituents of the exhaust gas (e.g., NOx gases such as such nitrous oxide, nitric oxide, nitrogen dioxide, etc.), flowing through the aftertreatment system 100 in the presence of a reductant, as described herein.

Although FIG. 1A shows only the SCR system 150 positioned within the internal volume defined by the housing 152, in other embodiments, a plurality of aftertreatment components may be positioned within the internal volume defined by the housing 152 in addition to the catalyst 154. Such aftertreatment components may include, for example, filters (e.g., particulate matter filters, catalyzed filters, etc.), oxidation catalysts (e.g., carbon monoxide, hydrocarbons and/or ammonia oxidation catalysts), mixers, baffle plates, or any other suitable aftertreatment component.

The catalyst 154 is formulated to selectively decompose constituents of the exhaust gas. Any suitable catalyst can be used such as, for example, platinum, palladium, rhodium, cerium, iron, manganese, copper, vanadium based catalyst, any other suitable catalyst, or a combination thereof. The catalyst 154 can be disposed on a suitable substrate such as, for example, a ceramic (e.g., cordierite) or metallic (e.g., kanthal) monolith core which can, for example, define a honeycomb structure. A washcoat can also be used as a carrier material for the catalyst 154. Such washcoat materials may comprise, for example, aluminum oxide, titanium dioxide, silicon dioxide, any other suitable washcoat material, or a combination thereof. The exhaust gas (e.g., diesel exhaust gas) can flow over and/or around the catalyst 154 such that any NOx gases included in the exhaust gas are further reduced to yield an exhaust gas which is substantially free of NOx gases.

An inlet conduit 102 is coupled to an inlet of the housing 152 and structured to receive exhaust gas from the engine 10 and communicate the exhaust gas to an internal volume defined by the housing 152. Furthermore, an outlet conduit 104 may be coupled to an outlet of the housing 152 and structured to expel treated exhaust gas into the environment. A first sensor 103 is positioned in the inlet conduit 102. The first sensor 103 may comprise a NOx sensor configured to measure an amount of NOx gases included in the exhaust gas flowing into the SCR system 150 and may include a physical NOx sensor or a virtual NOx sensor. In various embodiments, a temperature sensor, a pressure sensor, or any other sensor may also be positioned in the inlet conduit 102 so as to determine one or more operating condition of the exhaust gas flowing through the aftertreatment system 100.

A second sensor 105 may be positioned in the outlet conduit 104. The second sensor 105 may comprise a second NOx sensor configured to determine an amount of NOx gases in the exhaust gas expelled into the environment after passing through the SCR system 150. In other embodiments, the second sensor 105 may comprise an ammonia sensor configured to measure an amount of ammonia in the exhaust gas flowing out of the SCR system 150, i.e., determine the ammonia slip. This may be used as a measure of determining a catalytic efficiency of the SCR system 150, adjust an amount of reductant to be inserted into the SCR system 150, and/or adjust a temperature of the SCR system 150 so as to allow the SCR system 150 to effectively use the ammonia for catalytic decomposition of the NOx gases included in the exhaust gas flowing therethrough. An ammonia oxide (AMOx) catalyst may be positioned downstream of the SCR system 150, for example, in the outlet conduit 104 so as to decompose any unreacted ammonia in the exhaust gas downstream of the SCR system 150.

A reductant port 156 may be positioned on the inlet conduit 102 and structured to allow insertion of a dry reductant into a flow path of the exhaust gas flowing through the inlet conduit 102. As shown, the reductant port 156 is positioned upstream of the SCR system 150 (e.g., to allow reductant to be inserted into the exhaust gas upstream of the SCR system 150). In other embodiments, the reductant port 156 may be defined in the housing 152, for example, to deliver the reductant upstream or over the SCR system 150.

The reductant insertion system 120 comprises the dry reductant tank 122 containing a dry reductant, and the pressurized gas source 110. The dry reductant tank 122 may include a sealed container structured to store the dry reductant. Any suitable dry reductant may be used. In some embodiments, the dry reductant may include powdered urea, ammonia carbonate, ammonium carbamate any, other suitable ammonium salt or a combination thereof having small particles of the dry reductant. In various embodiments, additives such as flow agents and/or anti-caking agents may be included in the dry reductant (e.g., mixed with powdered urea) to help maintain reductant quality and/or to aid in flow of the reductant. Other additives may include, for example, dehydrating agents (e.g., silica) to absorb moisture and prevent clumping of the dry reductant powder. Any additive included in the dry reductant may be compatible with the downstream SCR system 150 and have minimal impact on exhaust gas emissions. In other embodiments, a moisture absorber (e.g., silica gel) may be positioned within the dry reductant tank 122 separate from the dry reductant. For example, the moisture absorber may be placed in a gas permeable pouch within the dry reductant tank 122, or in a cavity defined in the dry reductant tank 122. The moisture absorber may be replaced with a fresh moisture absorber, for example, when the dry reductant tank 122 is refilled.

In some embodiments, the particles of dry reductant used in the reductant insertion system 120 may have a diameter in a range of 1-100 microns. In particular embodiments, the particles of dry reductant used in the reductant insertion system 120 may have a diameter in a range of 10-30 microns. In various embodiments, the dry reductant tank 122 may be a removable tank, which may be replaced with a fresh tank once the dry reductant in the dry reductant tank 122 is consumed. In other embodiments, the dry reductant tank 122 may include a refillable tank which may be refilled with the dry reductant once an amount of the dry reductant in the dry reductant tank 122 drops below a predetermined threshold.

A reductant delivery line 130 operatively couples the dry reductant tank 122 to the SCR system 150. For example, as shown in FIG. 1A, the reductant delivery line 130 is coupled to the reductant port 156 and configured to deliver dry reductant into the flow path of the exhaust gas flowing through the inlet conduit 102. In various embodiments, a nozzle or orifice (not shown) may be provided in the reductant port 156 shaped and sized to insert an aerosol comprising the dry reductant particles into the exhaust gas flow path. Furthermore, a valve 124 or a dry reductant feeder (e.g., the dry reductant feeder 324 described herein) may be coupled to the dry reductant tank 122 and/or the reductant delivery line 130 with, or without the use of an eductor (e.g., the eductor 540) to selectively delivery the dry reductant to the inlet conduit 102 via the reductant delivery line 130.

In some embodiments, the reductant delivery line 130 and/or the nozzle or orifice disposed in the reductant port 156 may have thermal shielding or cooling features so as to prevent thermal degradation of the dry reductant (e.g., dry urea) that can produce undesirable byproducts (e.g., biuret, triuret, and/or cyanuric acid). Such features may include, for example, a heat shield, vacuum insulation and/or air cooling features may be provided on the reductant delivery line 130, and/or the nozzle or orifice to provide thermal shielding thereto. For example, the nozzle may include a vacuum insulated lance that, in some embodiments, may also be air cooled. Alternatively design features could be incorporated to prevent heat transfer from the exhaust gas to the nozzle and/or the reductant delivery line including, but not limited to, heat shields upstream of the nozzle, thermal barrier coatings, and/or reducing nozzle or reductant delivery line 130 surface area in the exhaust stream.

Figure 1B:
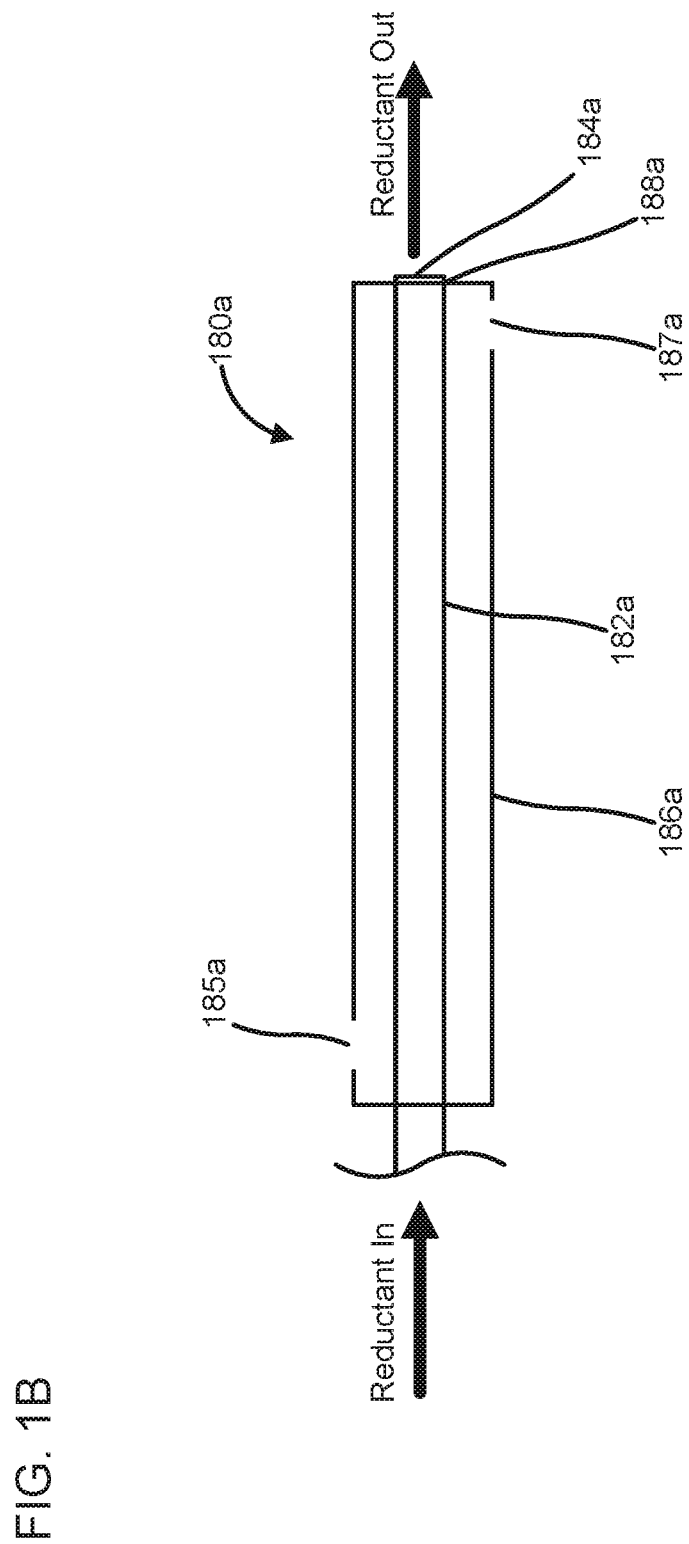
FIG. 1B is a schematic illustration of a lance assembly that may be used in the aftertreatment system of FIG. 1A, according to an embodiment.

For example, FIG. 1B is schematic illustration of a lance assembly 180a that may be used in the reductant insertion system 120 or any other reductant insertion system described herein for inserting the dry reductant into the exhaust gas flowing through the aftertreatment system 100. The lance assembly 180a may be disposed in or through the reductant port 156. The lance assembly 180a includes a lance 182a disposed within a hollow jacket 186a. The hollow jacket 186a may include, for example, a hollow tube that is disposed circumferentially around the lance 182a.

An end 184a of the lance 182a is fluidly coupled to or disposed through an outlet 188a defined in the jacket 186a. The end 184a may define a nozzle or orifice through which a stream of the reductant is inserted into the exhaust gas flowing through the aftertreatment system 100. While FIG. 1B shows the end 184a of the lance 182a, and the outlet 188a located at an axial end of the lance assembly 180, in other embodiments, the lance 182a may include a bend, for example, a 90 degree bend such that the end 184a is located at an angle with respect to a longitudinal axis of the lance assembly 180a. In such embodiments, the outlet 188a through is defined in a radial sidewall of the jacket 186a such that the reductant is inserted through end 184a of the lance 182a at an angle (e.g., an angle of about 90 degrees) with respect to the longitudinal axis of the lance assembly 180a.

The jacket 186a may define a first opening 185a, for example, through a radial sidewall thereof. In some embodiments, the opening 185a may be coupled to a vacuum source configured to draw air out of the internal volume defined by the jacket 186a so as to create a vacuum around the lance 182a and provide vacuum heat shielding. In other embodiments, a gas source (e.g., a compressed air source) may be fluidly coupled to the first opening 185a and configured to communicate the gas (e.g., air) into the jacket 186a for cooling the lance 182a. In such embodiments, a second opening 187a may also be defined in the jacket 186a (e.g., in the radial sidewall thereof), and configured to allow the gas, which may heat up within the jacket, to be communicated out of the jacket 186a. The heated gas may be cooled and recirculated back into the jacket 186a via the first opening 185a.

In some embodiments, the reductant insertion system 120 is configured to allow gravity assisted delivery of the dry reductant from the dry reductant tank to the SCR system 150. For example, the dry reductant tank 122 may be disposed at a higher elevation relative to the SCR system 150. The valve 124 may be coupled to the dry reductant tank 122 or the reductant delivery line 130. Opening of the valve 124 for a predetermined time allows a predetermined quantity (e.g., mass) of the dry reductant to be delivered through the reductant delivery line 130 into the SCR system 150.

In other embodiments, the pressurized gas source 110 is located within or operatively coupled to the dry reductant tank 122 and configured to communicate or propel dry reductant into the SCR system 150 using pressurized gas (e.g., dry air, dry nitrogen or recirculated exhaust gas). The pressurized gas may entrain the particles of the dry reductant (e.g., form an aerosol) and propel the dry reductant into the exhaust gas flow path.

Figure 3:
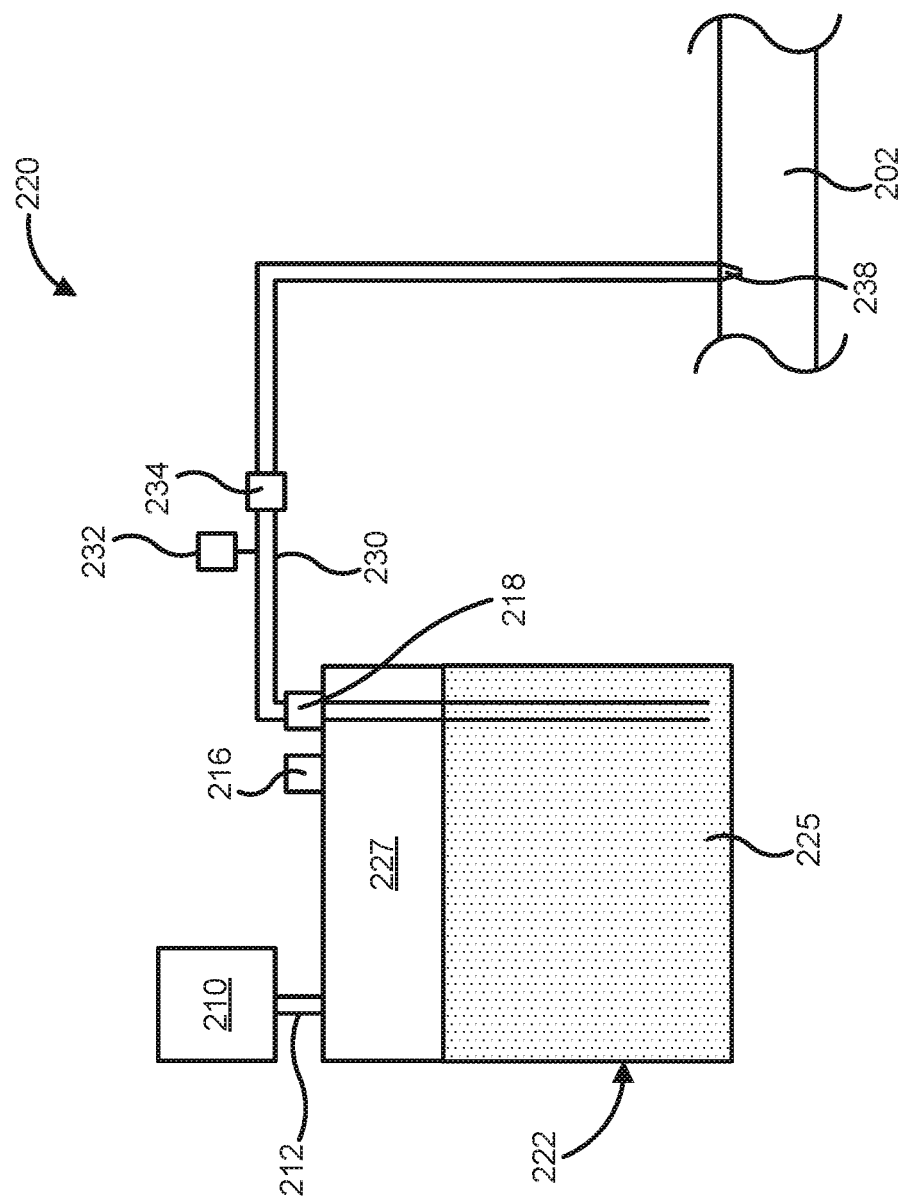
FIG. 3 is a schematic block diagram of a reductant insertion system, according to an embodiment.

Any suitable pressurized gas source may be used. In some embodiments, the pressurized gas source includes compressed gas occupying a volume of the dry reductant tank 122 and exerting pressure on the reductant. For example, FIG. 3 is a schematic illustration of a reductant insertion system 220 that may be used in the aftertreatment system 100, according to an embodiment. The reductant insertion system 220 includes a dry reductant tank 222 containing a volume of a dry reductant 225. A portion 227 of the internal volume of the dry reductant tank 222 is filled with compressed gas (e.g., dry air or dry nitrogen), which exerts a pressure on the dry reductant.

In some embodiments, a compressed gas source 210, for example, a tank of compressed gas may be coupled to the dry reductant tank 222 via a compressed gas line 212 and configured to provide compressed gas into the internal volume of the dry reductant tank 222. In some embodiments, a pressure release valve 216 (e.g., a check valve) may be operatively coupled to the dry reductant tank 222. The pressure release valve 216 may be configured to open in response to a pressure within the dry reductant tank 222 exceeding a predetermined pressure threshold and therefore so as to prevent excessive pressure buildup within the dry reductant tank 222.

A reductant delivery line 230 operatively couples the dry reductant tank 222 to an inlet conduit 202 (e.g., the inlet conduit 102 of the aftertreatment system 100). A nozzle 238 is positioned within the inlet conduit 202. An end of the reductant delivery line 230 distal from the dry reductant tank 222 is coupled to the nozzle 238 and delivers compressed gas with dry reductant particles entrained therein to the nozzle 238. The nozzle 238 may be shaped and sized to cause an aerosol of the dry reductant and compressed gas to be inserted into the exhaust gas flowing through the inlet conduit 202.

In some embodiments, a pressure sensor 232 is coupled to the reductant delivery line 230 and configured to measure a pressure of the compressed gas-dry reductant mixture flowing through the reductant delivery line 230. Furthermore, a valve 234 may also be disposed in the reductant delivery line 230. The valve 234 is configured to be selectively opened for communicating a predetermined volume of the dry reductant to the inlet conduit 202 (e.g., the inlet conduit 102 of the aftertreatment system 100). In particular embodiments, the pressure sensor 232 may be integrated with the valve 234.

In some embodiments, the reductant insertion system 220 may also include a shutoff valve 218. The shutoff valve may be coupled to an outlet of the dry reductant tank 222 or the reductant delivery line 230 and configured to selectively close to prevent dry reductant from being communicated out of the dry reductant tank 222, for example, in response to a safety issue (e.g., a leakage in the reductant delivery line 230 or the dry reductant tank 222).

Referring again to FIG. 1A, in some embodiments, the pressurized gas source 110 may include a compressed gas source coupled to a first end of the reductant delivery line 130 and configured to provide compressed gas therethrough to the SCR system 150. In such embodiments, the reductant insertion system 120 may further comprise a reductant communication line operatively coupling the dry reductant tank 122 to the reductant delivery line 130. A dry reductant feeder may be coupled to the reductant communication line and configured to communicate the dry reductant from the dry reductant tank 122 to the reductant delivery line 130 via the reductant communication line. In some embodiments, the dry reductant feeder may be further configured to prevent the compressed gas from flowing upstream thereof towards the dry reductant tank 122. In other embodiments, dry reductant may be inserted into the reductant delivery line 130 with the pressurized gas source being deactivated. Once a predetermined amount of the dry reductant has been delivered to the reductant delivery line 130, the pressurized gas source 110 may be activated to propel the dry reductant into the inlet conduit 102.

Figure 4:
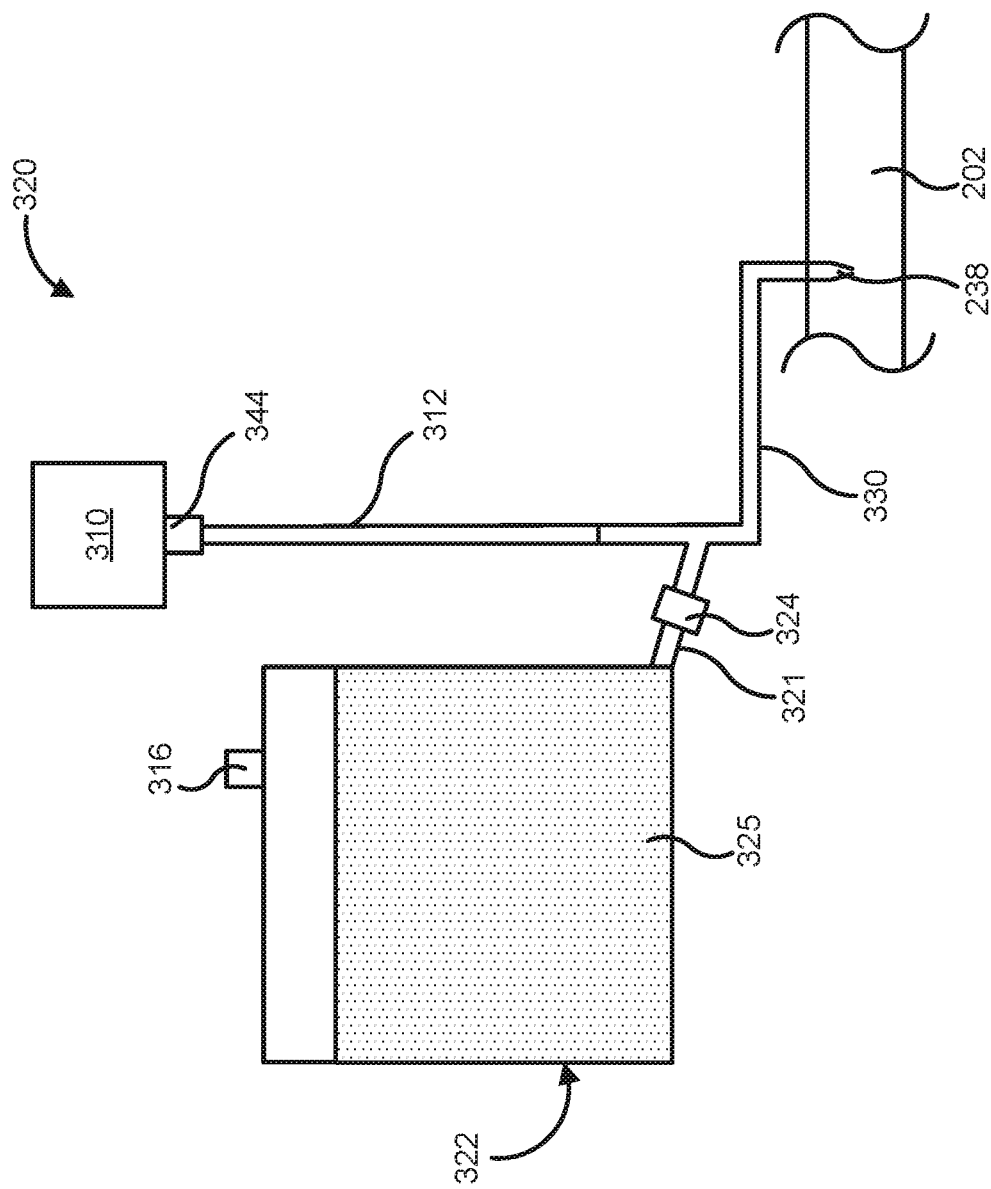
FIG. 4 is a schematic block diagram of a reductant insertion system, according to another embodiment.

For example, FIG. 4 is a schematic block diagram of a reductant insertion system 320 which may be used with the aftertreatment system 100, according to an embodiment. The reductant insertion system 320 includes a dry reductant tank 322 and a compressed gas source 310 (e.g., a dry air or dry nitrogen tank). The compressed gas source 310 is coupled to a reductant delivery line 330 via a compressed gas line 312, the reductant delivery line 330 being operatively coupled to the nozzle 238 positioned within the inlet conduit 202. A valve 344 may be coupled to the compressed gas source 310 and configured to be selectively opened for selectively communicating compressed gas to the reductant delivery line 330.

The dry reductant tank 322 is coupled to the reductant delivery line 330 via a reductant communication line 321. The dry reductant tank contains a dry reductant 325, for example, any of the dry reductants described herein. A pressure release valve 316 may be operatively coupled to the dry reductant tank 322 and configure to open in response to a pressure within the dry reductant tank 322 exceeding a predetermined pressure threshold (e.g., due to release of ammonia from the dry reductant 325 with the passage of time which accumulates within the dry reductant tank 322, therefore increasing a pressure therewithin). The dry reductant tank 322 may be configured to be refilled with the dry reductant. In embodiments in which the dry reductant is urea, the dry reductant tank 322 may be refilled by simply pouring urea into the dry reductant tank 322, for example, via a refill hatch (not shown). In other embodiments, in which the dry reductant tank 322 includes ammonia salts, the dry reductant tank 322 may be vented (e.g., via a vent valve) to remove any ammonia that may have accumulated in the dry reductant tank 322, before refilling with fresh ammonia salt.

A dry reductant feeder 324 is coupled to the reductant communication line 321 and configured to communicate the dry reductant from the dry reductant tank 322 to the reductant delivery line 330 via the reductant communication line 321. Furthermore, the dry reductant feeder 324 may be configured to prevent the compressed gas from flowing upstream thereof towards the dry reductant tank 322. For example, in some embodiments, the dry reductant feeder 324 may comprise a screw or belt feeder configured to feed a predetermined amount of the dry reductant into the reductant delivery line 330 via the reductant communication line.

In some embodiments in which the dry reductant feeder 324 includes a screw feeder, the dry reductant feeder 324 may be operated at a constant speed or a desired frequency (e.g., a pulse width modulated ON time) to reduce average dry reductant insertion into the inlet tube 202 (e.g., in order to maintain a turn down ratio in diesel SCR applications and/or reduce dry reductant consumption). In various embodiments, the dry reductant feeder 324 may include multiple screws having the same or different sizes to obtain appropriate turn down. In some embodiments, motors driving the screw feeder may be coupled to agitators provided with the dry reductant feeder 324, for example, to reduce clumping and facilitate consistent flow rate of the dry reductant.

In other embodiments, the dry reductant feeder 324 may comprise a valve configured to selectively allow gravity feed of the dry reductant into the reductant delivery line 330. In such embodiments, the compressed gas source 310 may be configured to stop providing compressed gas to the reductant delivery line 330 when the dry reductant feeder 324 is activated and is providing dry reductant to the reductant delivery line 330 (e.g., the valve is open). Once a predetermined amount of the dry reductant is communicated into the reductant delivery line 330, the dry reductant feeder 324 is deactivated (e.g., the valve is closed) and the compressed gas source 310 is activated to insert compressed gas into the reductant delivery line 330 to propel the dry reductant previously inserted to the reductant delivery line 330 into the inlet conduit 202 via the nozzle 238.

Figure 5:
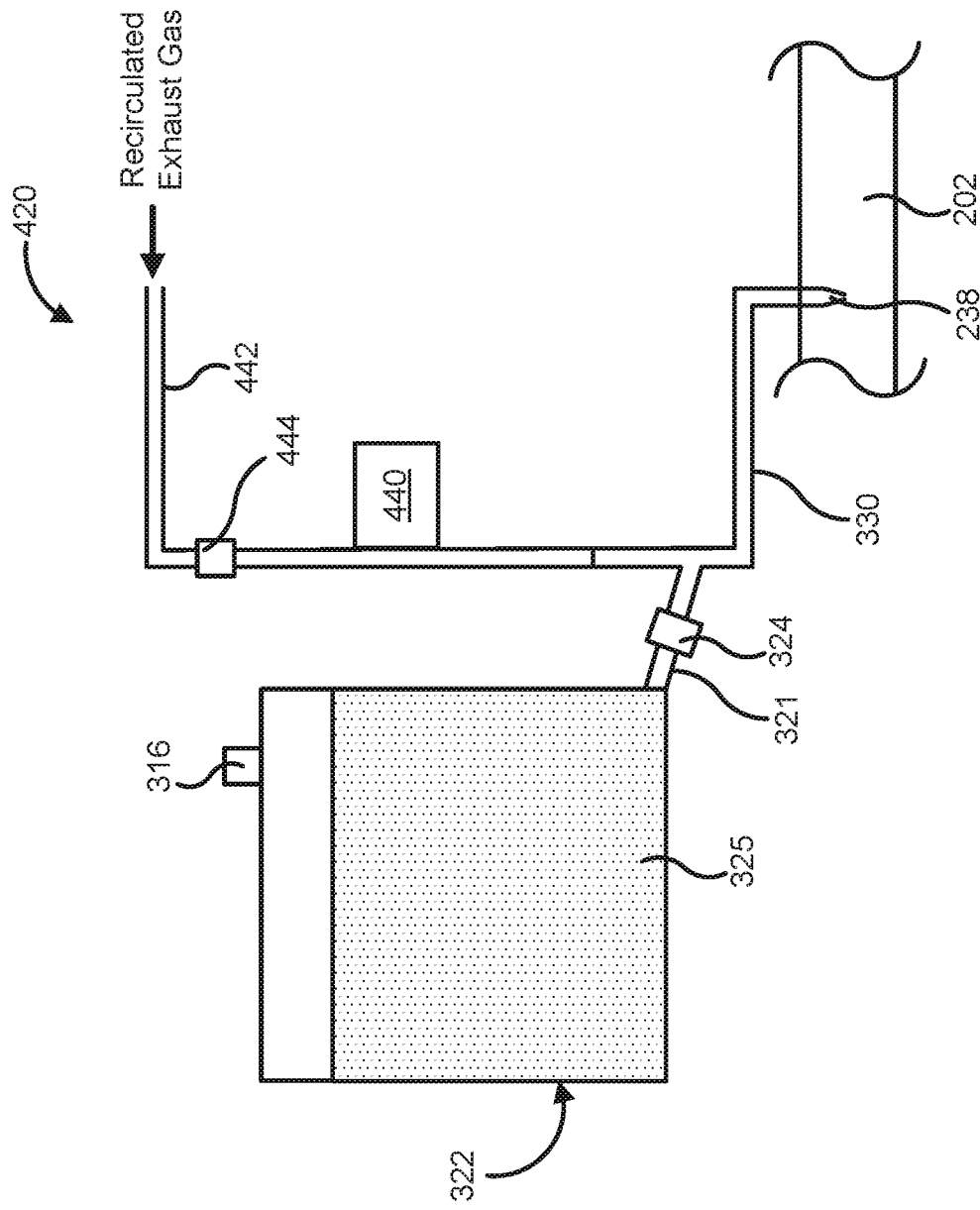
FIG. 5 is a schematic block diagram of a reductant insertion system, according to yet another embodiment.

Referring again to FIG. 1A, in some embodiments, the pressurized gas source 110 may include an exhaust gas recirculation line coupled to a first end of the reductant delivery line 130 such that the pressurized gas is recirculated exhaust gas. For example, FIG. 5 is a schematic block diagram of a reductant insertion system 420, according to another embodiment. The reductant insertion system 420 may be used in the aftertreatment system 100. The reductant insertion system 420 includes the dry reductant tank 322 coupled to the reductant delivery line 330 via the reductant communication line 321 through the dry reductant feeder 324, as previously described herein.

An exhaust gas recirculation line 442 is coupled to the reductant delivery line 330. The exhaust gas recirculation line 442 is configured to receive recirculated exhaust gas, for example, from downstream of the SCR system 150, and communicate the recirculated exhaust gas to the reductant delivery line 330. The recirculated exhaust gas may have a temperature sufficient to decompose dry reductant provided by the dry reductant feeder 324 so as to produce ammonia gas which is communicated into the exhaust gas flow path defined by the inlet conduit 202. In some embodiments, a valve 444 may be coupled to the exhaust gas recirculation line 442 and configured to be selectively opened for communicating the recirculated exhaust gas to the reductant delivery line 330.

In some embodiments, a heater 440 may be coupled to the exhaust gas recirculation line 442 or the reductant delivery line 330. The heater 440 may include an electric coil heater, a solid state heater or any other suitable heater configured to heat the recirculated exhaust gas to a temperature sufficient to substantially decompose the dry reductant. In other embodiments, the recirculated exhaust gas may be cooled, for example, by a cooler (not shown) to a temperature below the decomposition temperature of the dry reductant. In such embodiments, the recirculated exhaust gas entrains the particles of the dry reductant and propels the dry reductant into the exhaust gas flow path, where the dry reductant decomposes to release ammonia.

Referring again to FIG. 1A, in some embodiments, reductant insertion system 120 may also include an eductor coupled to the reductant delivery line downstream of the reductant communication line 130. The pressurized gas source 110 may be coupled to the reductant delivery line 130 via the eductor. The eductor (e.g., a vacuum pump) is configured to generate suction in the reductant delivery line 130 for delivering the dry reductant to the SCR system 150 via the reductant delivery line 130.

Figure 6:
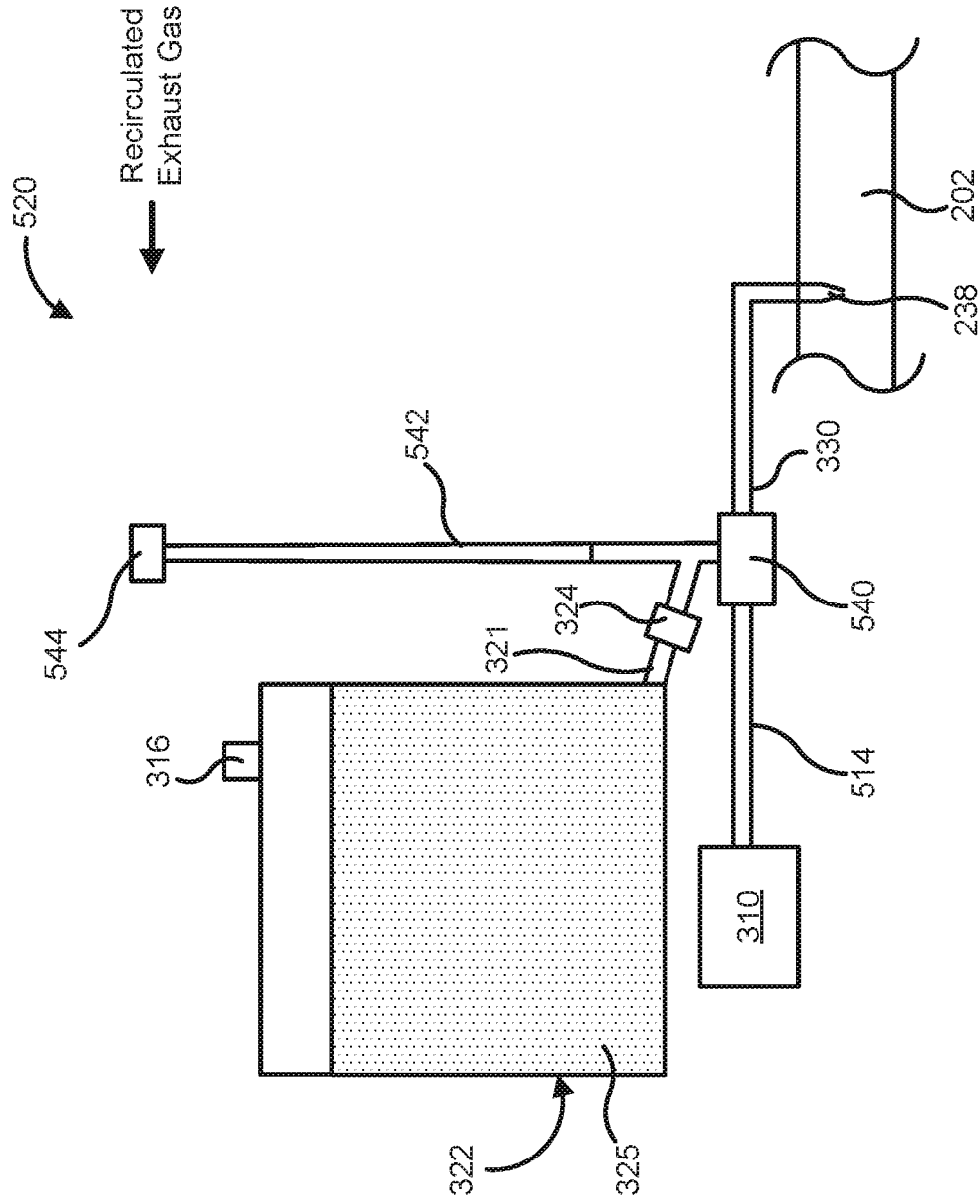
FIG. 6 is a schematic block diagram of a reductant insertion system, according to still another embodiment.

For example, FIG. 6 is a schematic block diagram of a reductant insertion system 520, according to another embodiment. The reductant insertion system 520 includes the dry reductant tank 322 containing a dry reductant, the pressurized gas source 310, and the dry reductant feeder 324 coupled to the reductant delivery line 330 via the reductant communication line 321, as described with respect to the reductant insertion system 320. Different from the reductant insertion system 320, an eductor 540 is coupled to the reductant delivery line 330 downstream of the reductant communication line 321. The eductor 540 may include a vacuum pump or a jet pump configured to generate suction in the reductant delivery line 330 for drawing the dry reductant communicated by the dry reductant feeder 324 into the reductant delivery line 330.

The pressurized gas source 310 (e.g., a compressed air or nitrogen tank) is coupled to the eductor 540 via gas line 514 and therefrom, to the reductant delivery line 330. The pressurized gas source 310 may be configured to propel the dry reductant drawn into the eductor 540, through the eductor 540 and the reductant delivery line 330 into the inlet tube 202.

In some embodiments, a first end of the reductant delivery line 330 upstream of the reductant communication line 321 may be open to atmosphere. For example, an atmosphere line 542 may be coupled to the first end of the reductant delivery line 330. An upstream end of the atmosphere line 542 is open to atmosphere. As eductor 540 generates suction, the eductor 540 draws atmospheric air through the atmosphere line 542. This may facilitate generation of vacuum as well as the incoming atmospheric air may facilitate communication of the dry reductant from the reductant communication line 321 to the eductor 540. In various embodiments, a filter 544 may be disposed at an inlet of the atmosphere line 542 and configured to remove particulate matter (e.g., dust, debris, organic/inorganic particles, etc.) from the atmospheric air being drawn into the atmosphere line 542.

Referring back to FIG. 1A, the aftertreatment system 100 also includes a controller 170. The controller 170 may be communicatively coupled to the pressurized gas source 110 and the dry reductant tank 122, for example, to the valve 124 coupled to the reductant delivery line 130 or the dry reductant tank 122. The controller 170 may also be coupled to the first sensor 103, the second sensor 105, and/or the engine 10 and configured to receive one or more operating condition signals therefrom for determining an operating condition of exhaust gas (e.g., an amount of NOx gases in the exhaust gas, exhaust gas temperature, exhaust gas pressure, exhaust gas flow rate, etc.). For example, the controller 170 may receive a signal from the engine 10 (e.g., engine speed signal, an engine torque signal, an air/fuel ratio signal, etc.), from the first sensor 103 and/or the second sensor 105 (e.g., a NOx signal, a temperature signal, a pressure signal, a flow rate signal, etc.) to the determine the operating condition of the exhaust gas. The controller 170 is also configured to control an amount of dry reductant inserted into the inlet conduit 202 and therefrom, into the SCR system 150. For example, the controller 170 may be configured to activate the pressurized gas source 110 and/or open the valve 124 (e.g., the valve 234) to insert the dry reductant or ammonia released from decomposed dry reductant (e.g., as described with respect to FIG. 5) into the inlet conduit 102.

The controller 170 may be operably coupled to the first sensor 103, the second sensor 105, the engine 10, the pressurized gas source 110 and/or the valve 124 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

Figure 2:
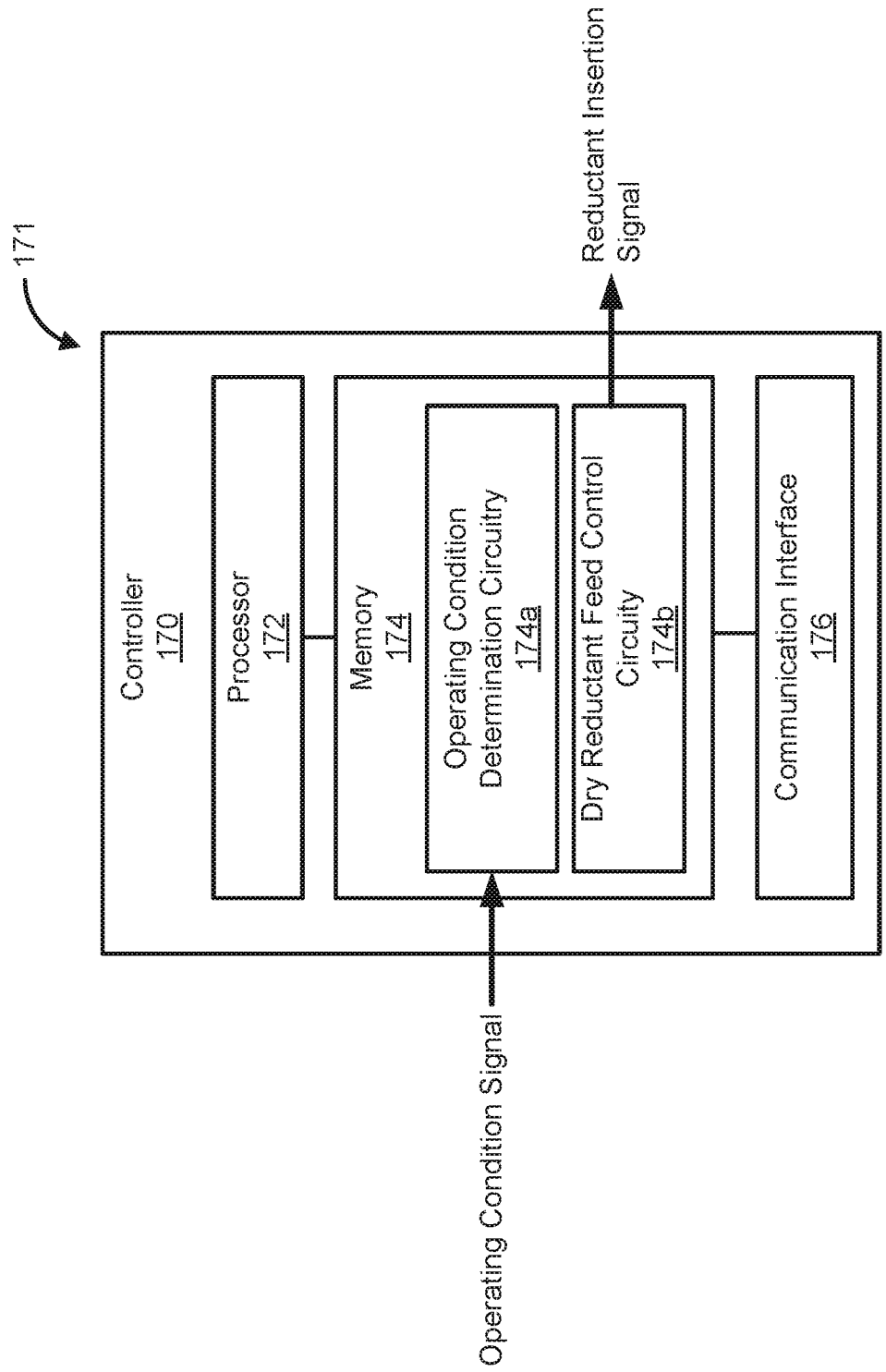
FIG. 2 is a schematic block diagram of a control circuitry that can include a controller of the aftertreatment system of FIG. 1A, according to an embodiment.

In particular embodiments, the controller 170 can be included in a control circuitry. For example, FIG. 2 is a schematic block diagram of a control circuitry 171 that comprises the controller 170, according to an embodiment. The controller 170 comprises a processor 172, a memory 174, or any other computer readable medium, and a communication interface 176. Furthermore, the controller 170 includes an operating condition determination circuitry 174a and a dry reductant feed control circuitry 174b. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the operating condition determination circuitry 174a and the dry reductant feed control circuitry 174b are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the operating condition determination circuitry 174a and the dry reductant feed control circuitry 174b are embodied as hardware units, such as electronic control units. As such, the operating condition determination circuitry 174a and the dry reductant feed control circuitry 174b may be embodied as one or more circuitry components including, but not limited to, processing circuitry, network interfaces, peripheral devices, input devices, output devices, sensors, etc.

In some embodiments, the operating condition determination circuitry 174a and the dry reductant feed control circuitry 174b may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the operating condition determination circuitry 174a and the dry reductant feed control circuitry 174b may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

Thus, the operating condition determination circuitry 174a and the dry reductant feed control circuitry 174b may also include programmable hardware devices such as field programmable gate arrays, programmable array logic, programmable logic devices or the like. In this regard, the operating condition determination circuitry 174a and the dry reductant feed control circuitry 174b may include one or more memory devices for storing instructions that are executable by the processor(s) of the operating condition determination circuitry 174a and the dry reductant feed control circuitry 174b. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the operating condition determination circuitry 174a and the dry reductant feed control circuitry 174b. Thus, the depicted configuration represents the aforementioned arrangement where the operating condition determination circuitry 174a and the dry reductant feed control circuitry 174b are embodied as machine or computer-readable media. However, as mentioned above, this illustration is not meant to be limiting as the present disclosure contemplates other embodiments such as the aforementioned embodiment where the operating condition determination circuitry 174a and the dry reductant feed control circuitry 174b, or at least one circuit of the operating condition determination circuitry 174a and the dry reductant feed control circuitry 174b are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the operating condition determination circuitry 174a and the dry reductant feed control circuitry 174b) may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the engine 10, the first sensor 103, the second sensor 105, the dry reductant tank 122 (or in other embodiments, the dry reductant feeder 324), the valve 124 (or in other embodiments, the valve 234, 344, 444) and/or the pressurized gas source 110, or another controller (e.g., an engine control unit). The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The operating condition determination circuitry 174a is configured to receive an operating condition signal (e.g., from the engine 10, the first sensor 103 and/or the second sensor 105) and determine an operating condition of the exhaust gas, as previously described herein. The dry reductant feed control circuitry 174b is configured to generate a reductant insertion signal based on the operating condition of the exhaust gas. For example, the reductant insertion signal may be configured to open the valve 124, 234 for a predetermined time to allow insertion of a predetermined volume of the dry reductant into the reductant delivery line 130, 230. In other embodiments, the reductant insertion signal may be configured to selectively activate the dry reductant feeder 324 to insert a predetermined amount of the dry reductant into the reductant delivery line 330. Furthermore, the reductant insertion signal may further be configured to activate the compressed gas source 310 or open the valve 344 to allow compressed gas to be communicated to the reductant delivery line 330, or open the valve 444 to allow recirculated exhaust gas to be communicated to the reductant delivery line 330. The compressed gas propels the dry reductant into the exhaust gas flow path, or the recirculated exhaust gas may decompose the dry reductant to generate ammonia gas which is communicated into the exhaust gas flow path.

Figure 7:
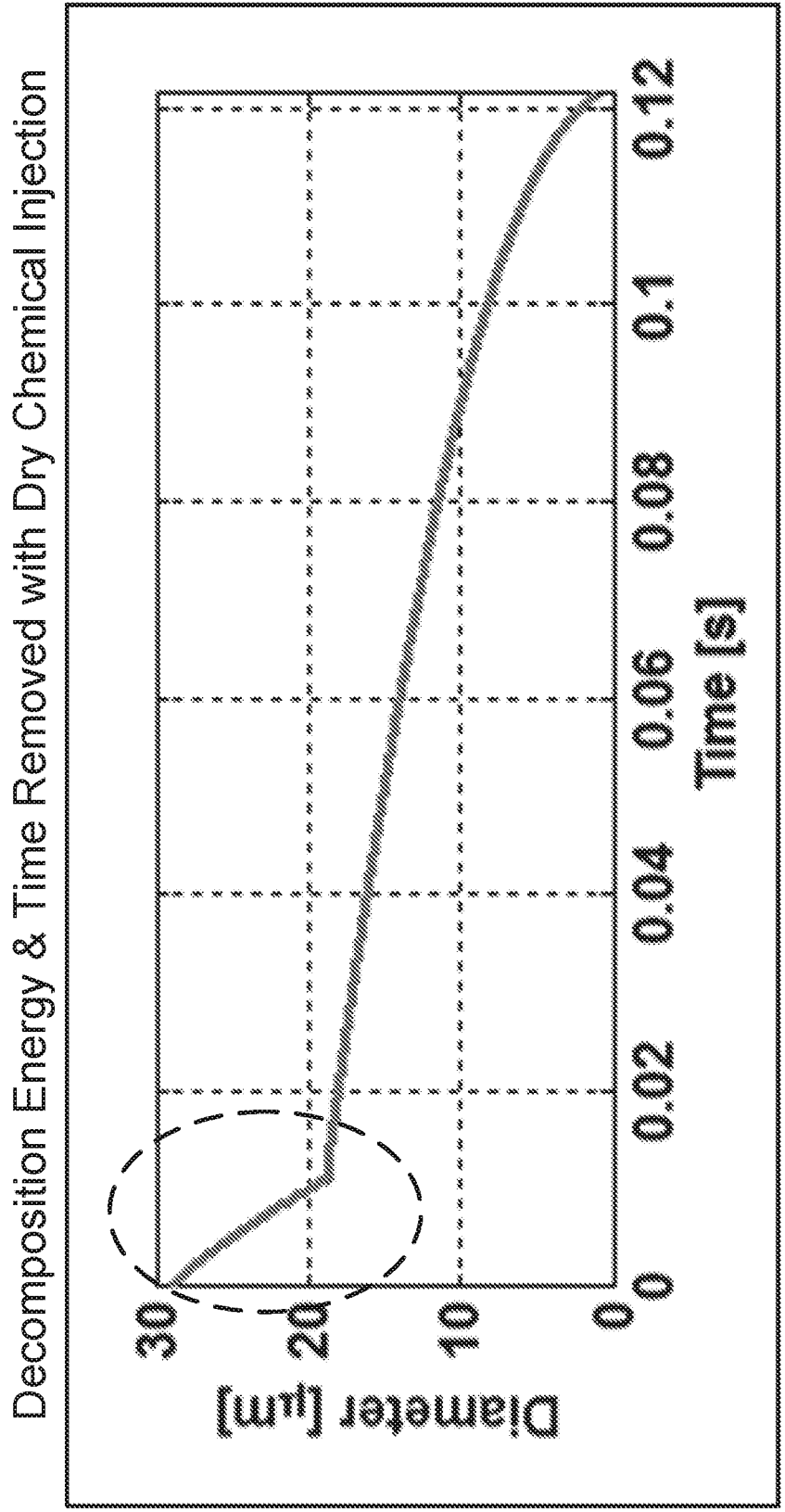
FIG. 7 shows a plot of particle size versus decomposition time of dry urea particles.

FIG. 7 shows a plot of particle size versus decomposition time of urea particles inserted into an exhaust gas flow path. Fastest decomposition time of less than about 0.01 seconds was observed for urea particles having a size in a range of 30-20 microns. Urea particles were observed to have a minimum decomposition temperature of 135 degrees Celsius. While liquid diesel exhaust fluid (DEF) has a decomposition energy of about 2,735 kJ/kg, urea thermolysis occurs at about 1,082 kJ/kg which provides about 60% reduction in decomposition energy. Regardless of particle size, ammonia generation is almost instantaneous with solid particles. However, complete decomposition of all the particles to deliver a complete ammonia dose may take a longer time depending on the particle size and the particular dry reductant being used. Decomposition time could be even faster with ammonia salts which decompose at a temperature of about 60 degrees Celsius. Lower decomposition temperature leads to faster decomposition which can allow the particle size to be increased significantly.

Figure 8:
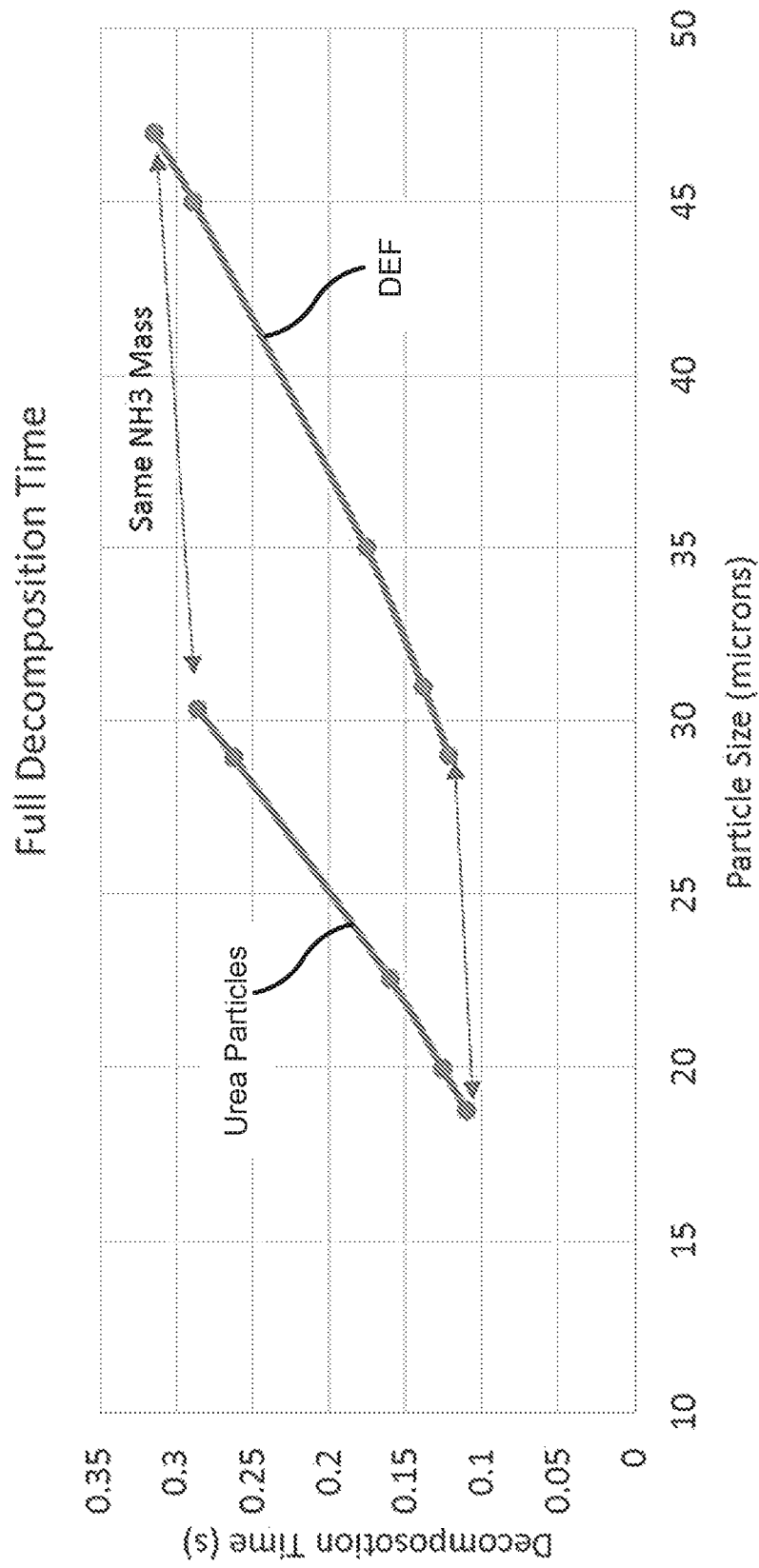
FIG. 8 shows plots of decomposition time of urea particles and diesel exhaust fluid (DEF) droplets having various sizes.

FIG. 8 shows plots of decomposition time versus particle size of dry urea particles relative to droplet size of DEF. Smaller urea particles contain about the same ammonia mass relative to larger sized DEF droplets which decompose within the same decomposition time. Thus, the storage tanks used for dry reductants can be made much smaller than DEF tanks and still contain the same ammonia mass, therefore allowing compact architecture.

Figure 9:
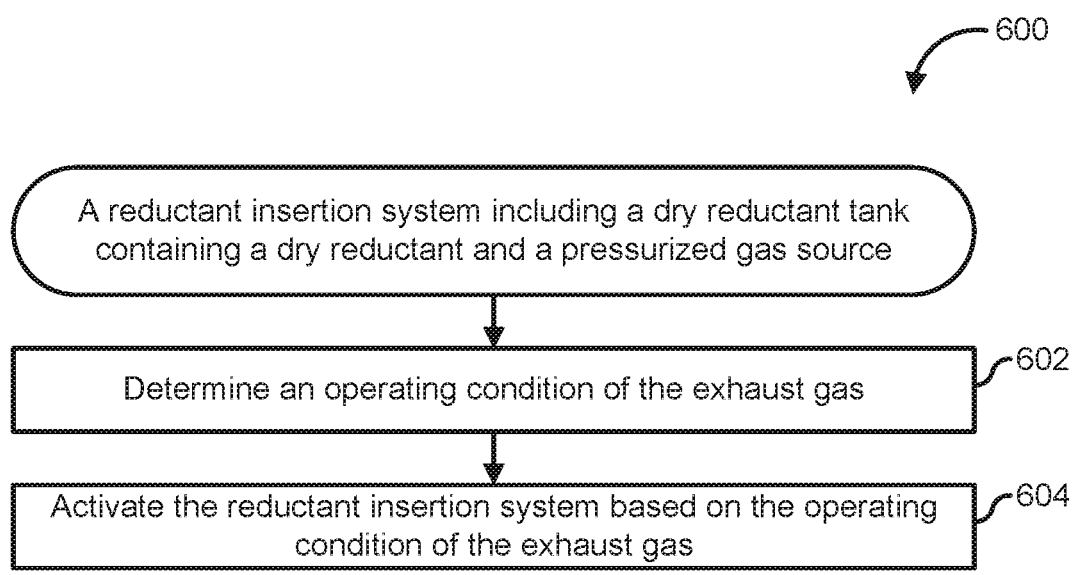
FIG. 9 is a schematic flow diagram of a method for inserting dry reductant into an aftertreatment system, according to an embodiment.

FIG. 9 is a schematic flow diagram of an example method 600 for inserting a dry reductant in an aftertreatment system (e.g., the aftertreatment system 100) using a reductant insertion system (e.g., the reductant insertion system 120, 220, 320, 420, 520) including a dry reductant tank (e.g., the dry reductant tank 122, 222, 322) and a pressurized gas source (e.g., the pressurized gas source 110, 210, 310). The method 600 includes determining an operating condition of the exhaust gas, at 602. For example, the operating condition determination circuitry 174a may receive an operating condition signal (e.g., from the engine 10, the first sensor 103 and/or the second sensor 105) and determine an operating condition of the exhaust gas, as previously described herein.

At 604, the reductant insertion system is activated based on the operating condition of the exhaust gas. For example, the dry reductant feed control circuitry 174b may generate a reductant insertion signal based on the operating condition of the exhaust gas. For example, the reductant insertion signal may be configured to open the valve 124, 234 for a predetermined time to allow insertion of a predetermined volume of the dry reductant into the reductant delivery line 130, 230. In other embodiments, the reductant insertion signal may be configured to selectively activate the dry reductant feeder 324 to insert a predetermined amount of the dry reductant into the reductant delivery line 330. Furthermore, the reductant insertion signal may further be configured to activate the compressed gas source 310 or open the valve 344 to allow compressed gas to be communicated to the reductant delivery line 330, or open the valve 444 to allow recirculated exhaust gas to be communicated to the reductant delivery line 330. In still other embodiments, the reductant insertion signal may be configured to also activate the eductor 540 to draw reductant into the reductant delivery line 330 which is the communicated in to the inlet tube 202 driven by compressed gas delivered by the pressurized gas source 310, as previously described herein.

Figure 10:
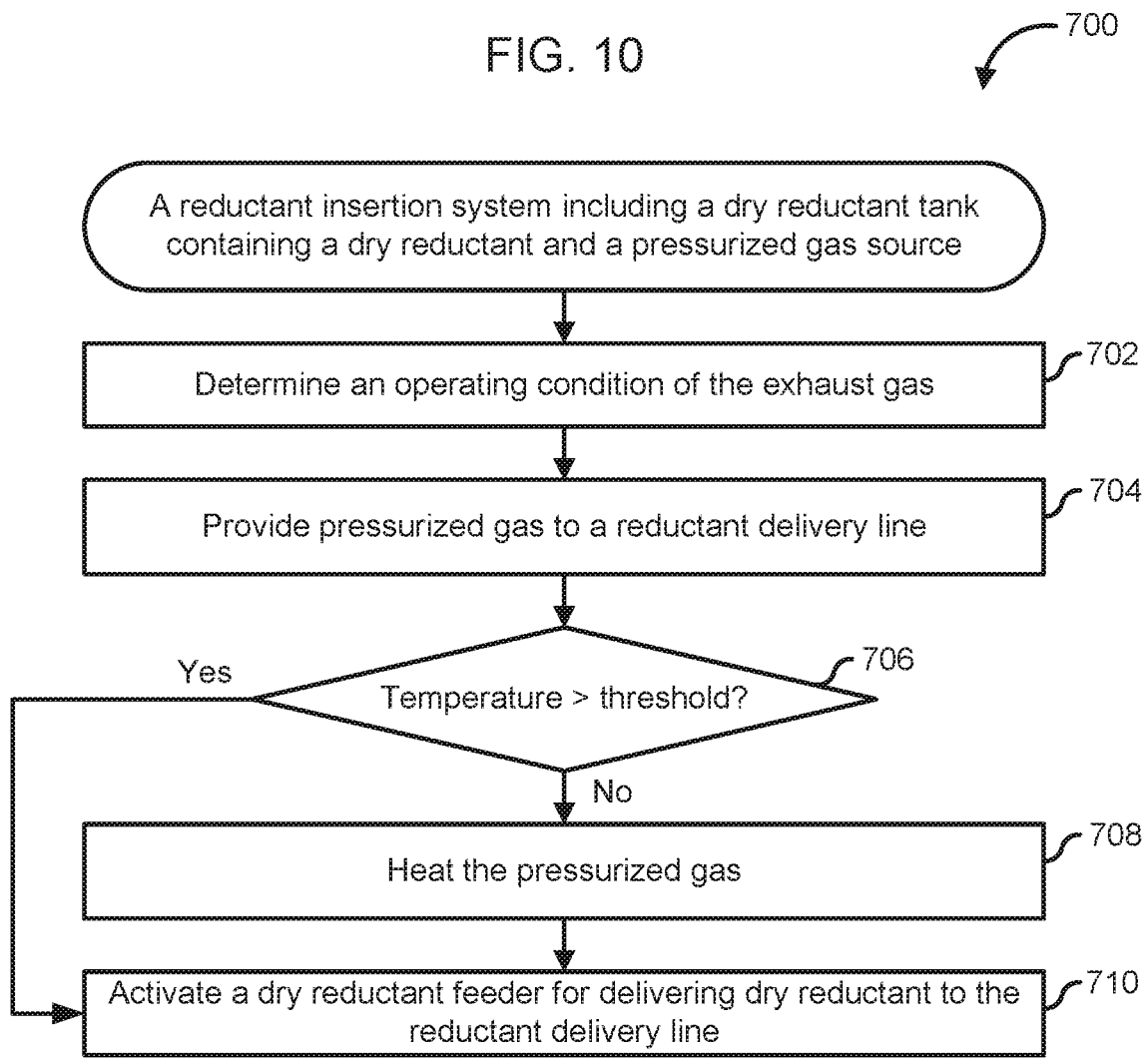
FIG. 10 is a schematic flow diagram of a method for inserting dry reductant into an aftertreatment system, according to another embodiment.

FIG. 10 is a schematic flow diagram of another method 700 for using a dry reductant system in an aftertreatment system (e.g., the aftertreatment system 100) using a reductant insertion system (e.g., the reductant insertion system 120, 420, 520) including a dry reductant tank (e.g., the dry reductant tank 122, 222, 322) and a pressurized gas source (e.g., the pressurized gas source 110, 210, 310 or the exhaust gas recirculation line 442). The method 700 includes determining an operating condition of the exhaust gas, at 702. For example, the operating condition determination circuitry 174a may receive an operating condition signal (e.g., from the engine 10, the first sensor 103 and/or the second sensor 105) and determine an operating condition of the exhaust gas, as previously described herein.

At 704, pressurized gas is provided to a reductant delivery line. For example, in some embodiments, the pressurized gas source 110 or the compressed gas source 310 may be activated (e.g., by the opening the valve 324) to provide pressurized gas (e.g., compressed dry air or nitrogen) to the reductant delivery line 130, 330. In particular embodiments, the pressurized gas source may include the exhaust gas recirculation line 442 and the pressurized gas includes recirculated exhaust gas. In such embodiments, the recirculated exhaust gas is provided to the reductant delivery line 330, for example, by opening the valve 444.

In some embodiments, it is determined if the temperature of the pressurized gas (e.g., recirculated exhaust gas) is greater than a predetermined temperature threshold, at 706. If the temperature is greater than the predetermined temperature threshold (706:YES), the method proceeds to operation 710, and a dry reductant feeder (e.g., the dry reductant feeder 324) is activated to deliver the dry reductant to the reductant delivery line (e.g., the reductant delivery line 330). In response to the temperature being less than the predetermined temperature threshold (706:NO), the pressurized gas is heated (e.g., via the heater 440) at 708, for example, to increase the temperature of the pressurized gas (e.g., the recirculated exhaust gas) to a temperature sufficient to decompose the dry reductant. The method 700 then proceeds to operation 710, as previously described herein.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," and the like as used herein mean the joining of two members directly or indirectly to one another. Such joining may be stationary (e.g., permanent) or movable (e.g., removable or releasable). Such joining may be achieved with the two members or the two members and any additional intermediate members being integrally formed as a single unitary body with one another or with the two members or the two members and any additional intermediate members being attached to one another.

As used herein, the term "about" generally mean plus or minus 10% of the stated value. For example, about 0.5 would include 0.45 and 0.55, about 10 would include 9 to 11, about 1000 would include 900 to 1100.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A reductant insertion system for an aftertreatment system configured to decompose constituents of an exhaust gas, comprising:
    a dry reductant tank configured to contain a dry reductant;
    a reductant delivery line configured to operatively couple the dry reductant tank to the aftertreatment system for delivery of the dry reductant into a flow path of the exhaust gas flowing through the aftertreatment system; and
    a pressurized gas source configured to communicate the dry reductant to the aftertreatment system through the reductant delivery line using pressurized gas, wherein the pressurized gas source comprises an exhaust gas recirculation line coupled to a first end of the reductant delivery line, the pressurized gas being recirculated exhaust gas;
    a reductant communication line coupling the dry reductant tank to the reductant delivery line; and
    a dry reductant feeder coupled to the reductant communication line and configured to communicate the dry reductant from the dry reductant tank to the reductant delivery line via the reductant communication line.

2. The reductant insertion system of claim 1, further comprising a valve disposed in the reductant delivery line, the valve configured to be selectively opened for communicating a predetermined volume of the dry reductant to the aftertreatment system.

3. The reductant insertion system of claim 2, further comprising a pressure sensor integrated with the valve.

4. A reductant insertion system for an aftertreatment system configured to decompose constituents of an exhaust gas, comprising:
    a dry reductant tank configured to contain a dry reductant;
    a reductant delivery line configured to operatively couple the dry reductant tank to the aftertreatment system for delivery of the dry reductant into a flow path the exhaust gas flowing through the aftertreatment system; and
    a pressurized gas source configured to communicate the dry reductant to the aftertreatment system through the reductant delivery line using pressurized gas, wherein the pressurized gas source comprises a compressed gas source coupled to the reductant delivery line and configured to provide compressed gas therethrough to the aftertreatment system;
    a reductant communication line operatively coupling the dry reductant tank to the reductant delivery line;
    a dry reductant feeder coupled to the reductant communication line and configured to communicate the dry reductant from the dry reductant tank to the reductant delivery line via the reductant communication line; and
    an eductor coupled to the reductant delivery line downstream of the reductant communication line, wherein the pressurized gas source is coupled to the reductant delivery line via the eductor, the eductor configured to generate suction in the reductant delivery line for delivering the dry reductant to the aftertreatment system via the reductant delivery line;
    wherein a first end of the reductant delivery line upstream of the reductant communication line is open to atmosphere.

5. The reductant insertion system of claim 1, further comprising a heater configured to heat the recirculated exhaust gas to a temperature sufficient to substantially decompose the dry reductant.

6. The reductant insertion system of claim 1, further comprising a valve coupled to the exhaust gas recirculation line and configured to be selectively opened for communicating the recirculated exhaust gas to the reductant delivery line.

7. A method for inserting dry reductant into an exhaust gas flowing through an aftertreatment system, the method comprising:
- determining an operating condition of the exhaust gas;
- providing a pressurized gas to a reductant delivery line of a reductant insertion system, the reductant insertion system comprising:
  - a dry reductant tank containing a dry reductant,
  - the reductant delivery line operatively coupling the dry reductant tank to the aftertreatment system, and
  - a pressurized gas source for providing the pressurized gas; and
- activating a dry reductant feeder of the reductant insertion system to deliver the dry reductant into a flow path of the exhaust gas flowing through the aftertreatment system via the reductant delivery line;
- wherein the pressurized gas source comprises a recirculated exhaust gas source.

8. The method of claim 7, further comprising:
- prior to providing the pressurized gas to the reductant delivery line, determining a temperature of the pressurized gas; and
- in response to the temperature being less than a temperature threshold, heating the pressurized gas to a temperature sufficient to decompose the dry reductant.

9. The method of claim 7, wherein the dry reductant feeder comprises a screw feeder.

* * * * *